(12) United States Patent
Fraley et al.

(10) Patent No.: US 8,897,375 B2
(45) Date of Patent: Nov. 25, 2014

(54) WIRELESS VIDEO MONITORING ON A MOBILE DEVICE

(75) Inventors: James J. Fraley, San Diego, CA (US); Ning Nicholas Chen, San Diego, CA (US)

(73) Assignee: Pluto Technologies, Inc., Carlsbad, CA (US)

( * ) Notice: Subject to any disclaimer, the term of this patent is extended or adjusted under 35 U.S.C. 154(b) by 0 days.

(21) Appl. No.: 12/772,827

(22) Filed: May 3, 2010

(65) Prior Publication Data

US 2010/0274614 A1  Oct. 28, 2010

Related U.S. Application Data

(63) Continuation of application No. 10/430,197, filed on May 5, 2003, now abandoned.

(51) Int. Cl.
| | |
|---|---|
| *H04N 7/12* | (2006.01) |
| *H04N 7/18* | (2006.01) |
| *H04N 5/232* | (2006.01) |
| *H04N 21/4143* | (2011.01) |
| *H04N 21/422* | (2011.01) |
| *H04N 21/4223* | (2011.01) |
| *H04N 21/4227* | (2011.01) |
| *H04N 21/458* | (2011.01) |
| *H04N 21/4788* | (2011.01) |
| *H04N 21/63* | (2011.01) |

(52) U.S. Cl.
CPC ........... *H04N 7/183* (2013.01); *H04N 5/23203* (2013.01); *H04N 7/185* (2013.01); *H04N 21/4143* (2013.01); *H04N 21/42202* (2013.01); *H04N 21/4223* (2013.01); *H04N 21/4227* (2013.01); *H04N 21/4586* (2013.01); *H04N 21/4788* (2013.01); *H04N 21/632* (2013.01)
USPC ..................................................... 375/240.25

(58) Field of Classification Search
CPC ........................... H04N 7/185; G08B 13/1966
USPC ..................................................... 375/240.25
See application file for complete search history.

(56) References Cited

U.S. PATENT DOCUMENTS

| | | | | |
|---|---|---|---|---|
| 3,845,467 | A * | 10/1974 | Oman et al. .................. | 340/3.53 |
| 6,014,694 | A * | 1/2000 | Aharoni et al. ............... | 709/219 |
| 6,385,772 | B1 * | 5/2002 | Courtney ....................... | 725/105 |
| 6,661,340 | B1 * | 12/2003 | Saylor et al. .................. | 340/517 |
| 6,956,599 | B2 | 10/2005 | Lim et al. .................... | 348/14.02 |
| 7,457,633 | B2 * | 11/2008 | Scheinert et al. ........... | 455/550.1 |
| 2003/0142217 | A1 * | 7/2003 | Maehama et al. ....... | 348/207.99 |
| 2003/0206238 | A1 * | 11/2003 | Kawai et al. ............. | 348/333.01 |
| 2004/0013192 | A1 | 1/2004 | Kennedy ......................... | 375/240 |
| 2004/0143602 | A1 * | 7/2004 | Ruiz et al. ................... | 707/104.1 |
| 2004/0190614 | A1 * | 9/2004 | Schlockermann et al. ........................ | 375/240.12 |
| 2004/0218672 | A1 * | 11/2004 | Bourne et al. ........... | 375/240.12 |

* cited by examiner

*Primary Examiner* — Richard Torrente
(74) *Attorney, Agent, or Firm* — DLA Piper US LLP

(57) ABSTRACT

A mobile device management system including a method for monitoring a remote video camera and event scheduling, synchronization and modification using location information. Video from a remote camera is encoded by a computer and streamed in real time over a network to a mobile device for decoding and display. The computer encoder and mobile device decoder are software-based. Event calendar and schedule information is incorporated, shared and automatically updated among multiple mobile devices. Location information, such as from a locator network or a satellite-based global positioning system, is used to provide real time updates to a mobile device calendar or event schedule. A map or other indicia of the location of other mobile devices may be provided.

15 Claims, 8 Drawing Sheets

WIRELESS VIDEO MONITORING ON A MOBILE DEVICE

CROSS-REFERENCE TO THE RELATED APPLICATIONS

This application is a continuation of application Ser. No. 10/430,197, filed on May 5, 2003, the entire content of which is incorporated herein by reference.

FIELD OF THE INVENTION

The present invention relates to mobile communication systems and, in particular, relates to a mobile device management system.

BACKGROUND OF THE INVENTION

The industrialized world is becoming increasingly reliant on mobile technologies, such as wireless voice and data transmission. In addition to voice and data transmission, users now demand useful and innovative video and multimedia applications that are supported by their cell phones and personal digital assistants (PDAs). One video application that would be of particular utility to a mobile device user is the ability to view and monitor feed from a remote video camera on their mobile device. The delivery of live video feed generally requires broadband transmission media capable of supporting a very high data rate signal. Wireless systems, however, are typically characterized by lower device processing power and channels having reduced bandwidth and lower reliability. Hence, the receipt and display of video feed from a remote camera on a mobile device is difficult to achieve over a wireless link.

Mobile device users also demand reliable and innovative mechanisms for updating personal data, such as calendar and scheduling information, that is stored on their mobile devices. The ability to update calendar and schedule information with real time location information about other mobile device users with whom the user is scheduled to or desires to interact would be particularly invaluable. Typically, however, personal data stored on a mobile device is updated via synchronization with a larger system such as a server or personal computer. The mobile device usually must be cabled to the system for update of personal data and calendar information, and the updates are often user-initiated rather than system-driven or automatic. Real time, automatic updating of calendar information incorporating location information about other mobile devices is not provided by current systems.

SUMMARY OF THE INVENTION

One aspect of the invention is a system for monitoring a remote camera on a mobile device. Live video images from the remote camera are captured and streamed in real time over a network to the mobile device. The images may be encoded prior to streaming with a software-based encoder, and decoded by the mobile device using a software-based video decoder. Control signals may be sent from the mobile device to the camera to remotely control the camera. Modifications to standard video compression and streaming protocols are provided to better suit a mobile device environment.

Another aspect of this invention is a system for mobile device event management, using location and calendar information. Calendar and location information is shared among multiple devices and used to schedule, re-schedule and manage events. The relative proximity of the mobile devices may be displayed.

Additional features, aspects and improvements of this invention will be apparent after review of the following figures and detailed description, and are intended to be within the scope of this invention and protected by the accompanying claims.

DETAILED DESCRIPTION OF THE INVENTION

The present invention provides a comprehensive system for mobile device management. It includes a system for monitoring, receiving and displaying video feed from a remote camera on a mobile device, and a system for real time mobile device event management using calendar and location information. Drawbacks associated with existing event scheduling methodologies are overcome by incorporating real time location information and video feed into a robust system of mobility management that has application in several practical areas, including surveillance, safety and security.

Figure 1:
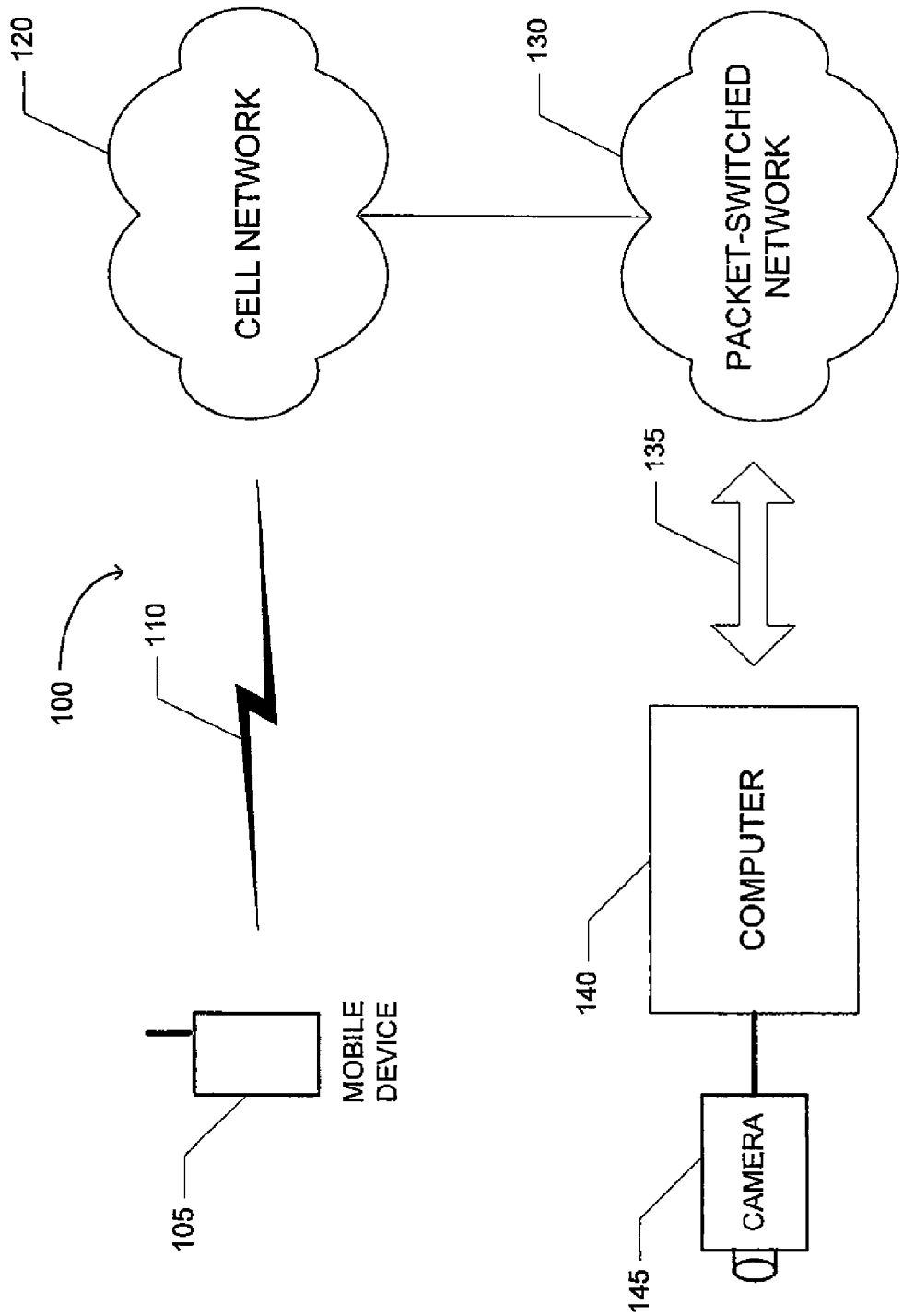
FIG. 1 is a diagram of an inventive mobile device video monitoring system.

FIG. 1 illustrates a wireless video monitoring system 100. Video monitoring system 100 has broad application and may be implemented wherever it is advantageous to use a mobile or wireless device (such as a cellular telephone) to monitor images captured by a remote camera. With monitoring system 100, for example, a mobile device can be employed to monitor one's home while on vacation, or to monitor the babysitter or the pets. As will be described below, the present invention even allows the mobile device user to issue control signals to the camera to change the video feed that is received by the mobile device.

Referring to FIG. 1, mobile device 105 is coupled to cell network 120 over air interface 110. Computer 140 delivers a live video image from camera 145 to mobile device 105 via network connection 135, packet-switched network 130 and cell network 120. Cell network 120 can be a public or private cellular network providing the necessary architecture for mobile call maintenance, including base station subsystem(s), mobile switching center(s), location registries and other infrastructure components. In one embodiment, cell network 120 is a public, wireless wide area network (W-WAN) supporting one or more multiple access schemes (i.e., TDMA, CDMA, etc.) and coupled to the Internet.

Packet-switched network 130 is a public or private wide area network (WAN) or local area network (LAN) supporting transport services for delivering video packets between camera 145 and mobile device 105. In one embodiment, network 130 is a private intranet supporting a proprietary packet transport mechanism. In another embodiment, network 130 is the Internet and supports the transmission control protocol (TCP) and Internet protocol (IP). In this embodiment, computer 140 is configured with either a static or dynamic IP address. Mobile device 105 can be manually configured with the IP address of computer 140, or configured to receive the IP address of computer 140 dynamically, using for example, the short message service (SMS) protocol to communicate the IP addressing information.

Network connection 135 can use a variety of data communication technologies to connect computer 140 to packet-switched network 130. If network 130 is the Internet, computer 140 can connect to Internet 130 using an Internet service provider (ISP) under a variety of connectivity options, including cable, digital subscriber line (DSL), or asynchronous dial-up access over the public switched telephone network (PSTN) using a conventional modem. Network connection 135 can also be a high-speed dedicated circuit running between an ISP and computer 140. Network connection 135 can itself incorporate a wireless data communication link. The test results described were achieved using a cable modem to connect between computer 140 and packet-switched network (Internet) 130.

Mobile device 105 may be one of many widely available wireless communication devices, such as a cellular telephone, a personal digital assistant (PDA), a laptop personal computer equipped with a wireless modem or even a smart mobile television. Exemplary implementations of mobile device 105 include a Sharp® code division multiple access (CDMA) cellular telephone (used by the inventors as a prototype) and a Palm™ handheld device with wireless capability. System 100 supports true device independence and is uniquely tailored to run on nearly all third generation CDMA phones on the market.

Figure 2:
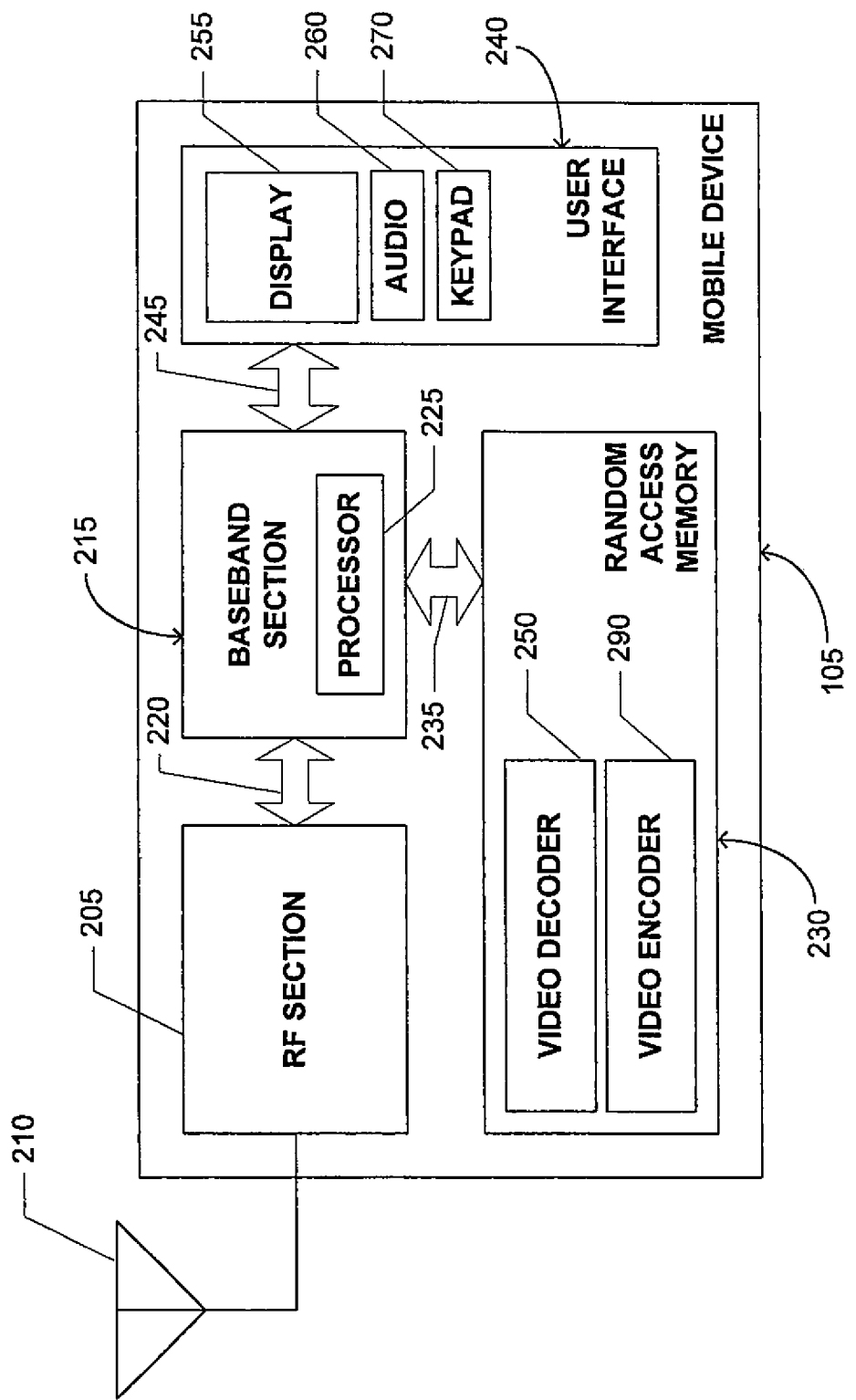
FIG. 2 is a block diagram illustrating the components of the mobile device of FIG. 1 in more detail.

FIG. 2 illustrates mobile device 105 in more detail. Radio frequency (RF) section 205 is coupled to antenna 210 for receiving and transmitting RF signals. RF section 205 communicates with baseband section 215 over bus 220. Baseband section 215 comprises a processor 225 for voice and data signal processing. Baseband section 215 stores and retrieves data from random access memory (RAM) 230 over memory bus 235. Baseband section 215 also communicates with user interface 240 over interface bus 245. User interface 240 typically comprises a display 255 for displaying text, graphics or video, a keypad 270 for entering data and dialing, and an audio system 260, such as a speaker.

Mobile device 105 is preferably configured with a software video decoder 250 for decoding video signals. Mobile device 105 may also be configured with a software video encoder 290 for encoding and transmitting video control information. By implementing the encoding and decoding processes in software, system 100 is device and processor independent. In other words, viewing a video bit stream is possible on any mobile device because the video decoder and encoder are implemented in software rather than embedded or hard-coded for operation on a particular wireless device chipset.

Use of an application programming interface (API) provides the abstraction layer needed to support device and processor independence. Function calls from decoder 250 can be written to conform to a particular API, such as Sun Microsystems® Inc.'s Java 2 micro edition (J2ME) or Qualcomm® Inc.'s binary runtime environment for wireless (BREW), instead of to a particular chip (i.e., processor). If the encoding and decoding software is written in BREW, for example, the video decoder and encoder can be loaded and run on any mobile device that supports BREW. An API such as BREW is also useful for providing the necessary IP connectivity. Video decoder 250 can be written to pass IP-related function calls to the BREW API, which will then handle the details of establishing a link between mobile device 105 and computer 140.

The achievable frame rate, video rendering quality and performance are functions of the processing power and memory at the disposal of mobile device 105. For delay-sensitive live video feed, for example, a relatively fast processor is needed to eliminate frame latency. During a system test, the inventors achieved six frames per second using an advanced RISC machine (ARM) 7 processor with 100 kilobytes of RAM embedded in a Qualcomm® MSM 3100 chipset in a prototype Sharp® CDMA cell phone.

Video encoder 290 may send control data over cell network 120 and packet-switched network 130 to computer 140 to control camera 145. Hence, a mobile user can remotely control basic camera functions, such as pan, zoom, and tilt, from device 105. Video encoder 290 is preferably a software-based video encoder loaded into RAM 230. A mobile device 105 including both decoder 250 and encoder 290 supports full duplex operation with live video feed in one direction (from camera 145 to mobile device 105) and control information in the other direction (from mobile device 105 to camera 145).

The protocol used to stream video can be a standard packet-based video compression protocol such as the MPEG4 video compression standard, modified to control special features and limitations of the present invention. The video frame flow control mechanism is modified to accommodate the relatively limited amount of mobile device frame buffer space that is available. Device 105 waits until assembly of a complete multi-packet video frame is complete before signaling computer 140 (typically with a one byte header) to send another frame. Computer 140 waits for receipt of this header before sending another video frame to the mobile device. This differs from conventional TCP protocol and is advantageous because MPEG4 video decoding is resource and bandwidth intensive while device 105 is typically bandwidth limited. The prototype CDMA phone used in the inventors' tests, for example, had a useable 14 kilobits per second of bandwidth.

Since a typical mobile device will lack the storage capacity to permanently store an incoming video image or stream, another important feature of system 100 is configuring the size and resolution of mobile device display 255 to best take advantage of the available storage capacity. Display 255 may be an LCD panel having a resolution large enough to accurately distinguish and render a video image. In one embodiment, display 255 is a color display capable of supporting an MPEG4 compressed video bit stream. Other display technologies and display enhancements commonly found on wireless devices, such as windowing and backlighting, are supported by system 100. The video display features of the API that is used, such as BREW, can be employed to effect display of the video image. Satisfactory results were achieved in a laboratory prototype developed by the inventors that included a cell phone having a 256 color, (8-bit) 128×144 pixel display supporting a video image having a frame size of 128 pixels tall by 96 pixels wide.

Figure 3:
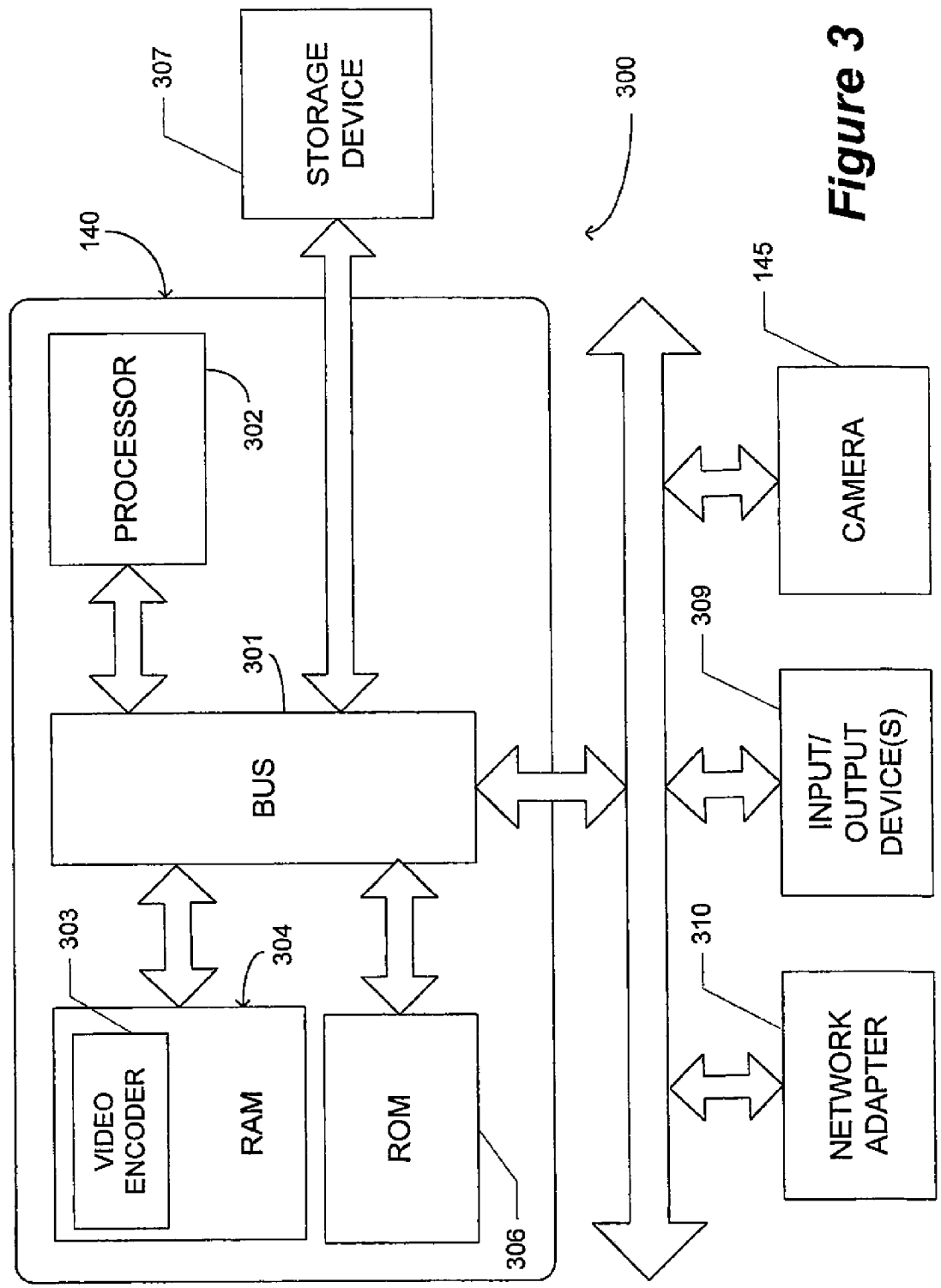
FIG. 3 is a block diagram illustrating the components of the computer system of FIG. 1 in more detail.

A computer system 300 including computer 140 and camera 145 is illustrated in more detail in FIG. 3. Computer 140 preferably has a software-based video encoder 303 and may be configured to operate as a video server. This is a significant departure from streaming video systems which employ hardware-based video encoders. A software video encoder provides many advantages, including efficient resource utilization and no special hardware requirements. So long as it has the minimum components needed to load and run a software video encoder, computer 140 may be a conventional desktop computer including components such as a processor 302, a dynamic memory (RAM) 304 and a static memory (ROM) 306 coupled via a bus 301 or other communication mechanism. An external storage device 307, such as a magnetic or optical disk, input/output devices 309, such as a keyboard and a monitor, and a network adapter 310, such as a network interface card (NIC), may also be coupled to computer 140.

Video camera 145 may be any camera capable of capturing and streaming a video image to computer 140 for transmission to mobile device 105. Connectivity between computer 140 and camera 145 can be a simple universal serial bus (USB) or other serial cable connector. The video generated by camera 145 may be a still image, such as an image presentable in PEG format, or a component of a live streaming video feed, such as a feed presentable in MPEG4 format.

As mentioned, computer 140 is preferably configured with a software video encoder 303 stored in the dynamic memory or RAM 304. As described with respect to mobile device 105, hardware independence is achieved by the use of a software-based decoder. The video decoding software is written to a particular operating system API, such as Microsoft Windows® or Linux®, rather than embedded or hard-coded for operation on a particular processor. The prototype computer used by the inventors included an Intel Pentium® III processor running Microsoft Windows®.

Computer 140 may be deployed in a client/server environment having multiple mobile devices, video cameras and servers. Mobile device 105 typically acts as a client (video decoder 250) and computer 140 acts as a server (video encoder 303). Additionally, as described, mobile device 105 may include software-based video encoder 290 for transmitting camera control signals to computer 140.

Figure 4:
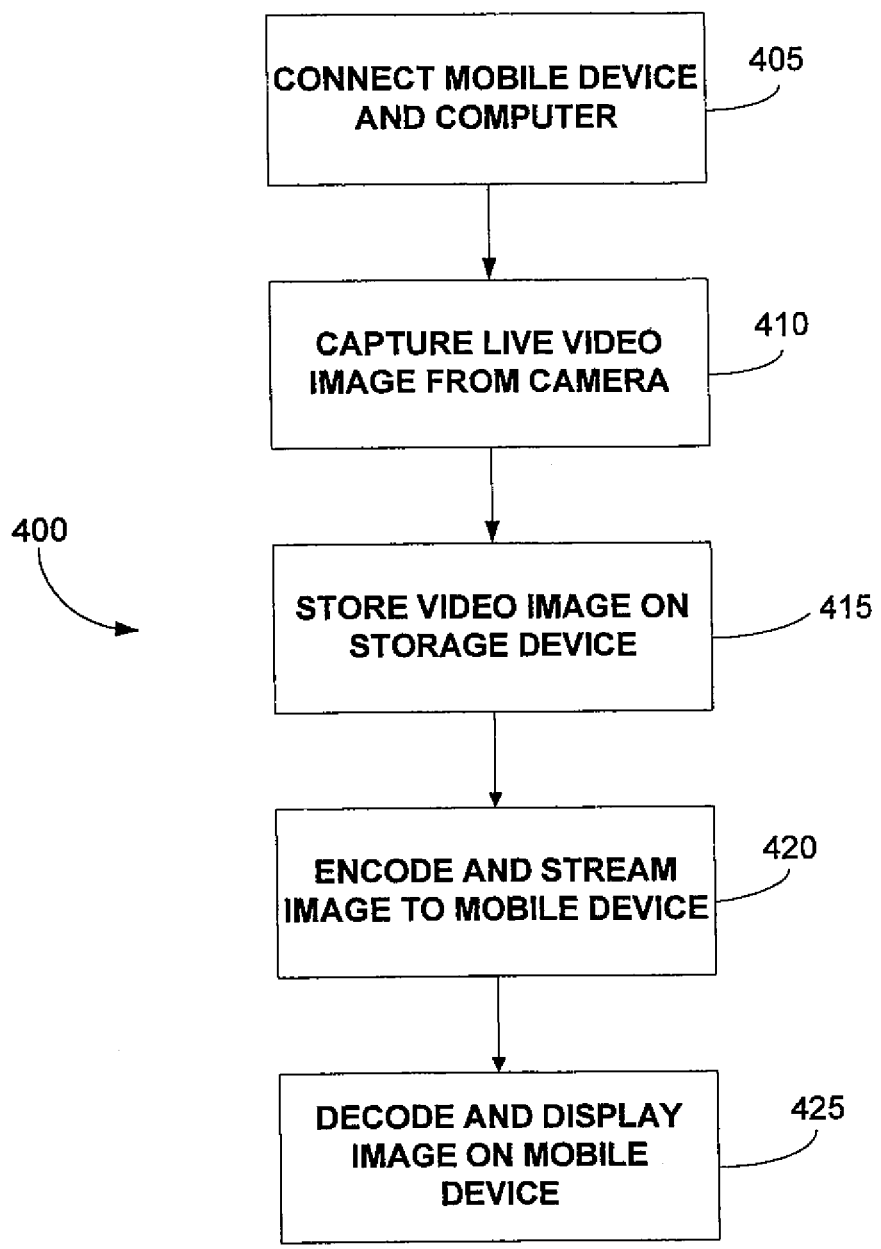
FIG. 4 is a flow diagram of an inventive method for delivering and displaying video on a mobile device.

FIG. 4 depicts a method 400 for delivering video from camera 145 to mobile device 105 for display. In step 405, connectivity is established between mobile device 105 and computer 140. In step 410, computer 140 captures a live video image from camera 145. In step 415, computer 140 stores the captured image on a storage device, such as storage device 107. Alternatively, the video can be stored on a storage device located within or associated with network 130. In step 420, computer 140 encodes and streams the video image to mobile device 105 over packet-switched network 130 and cell network 120. In step 425, mobile device 105, receives, decodes and displays the video image on display 255. As previously described, device 105 waits for receipt of a complete multi-packet video frame before signaling computer 140 to send another frame.

Several modes of operation are envisioned. In a "live" mode, the mobile user may simply view live video feed in real time. In a "history" mode, computer 140 may assemble and deliver to mobile device 105 a summary file containing images of significant activity only. Timestamps may accompany the images logged in the summary file. A motion detector, for example, may be coupled to or proximate camera 145, and only those portions of video feed in which motion occurs would be deemed "significant" by computer 140 and added to the summary file. In an "alert" mode, a real time alert along with video feed may be provided to the mobile device user upon motion detection. The history and alert modes are very useful for security and surveillance applications.

Another aspect of this invention is a system and method for real time mobile device event scheduling, synchronization and modification, using location information. Intelligent event calendar and schedule information is incorporated and shared among multiple mobile devices. A first mobile device updates its calendar/event schedule by obtaining location and calendar information from a second mobile device. The location information may be obtained with the assistance of a global positioning system (GPS) and used to graphically represent the location of the second mobile device on the display of the first mobile device. Audible or visible indicia of the proximity of the second device can also be provided, such as by a beeping sound or an LED.

Figure 5:
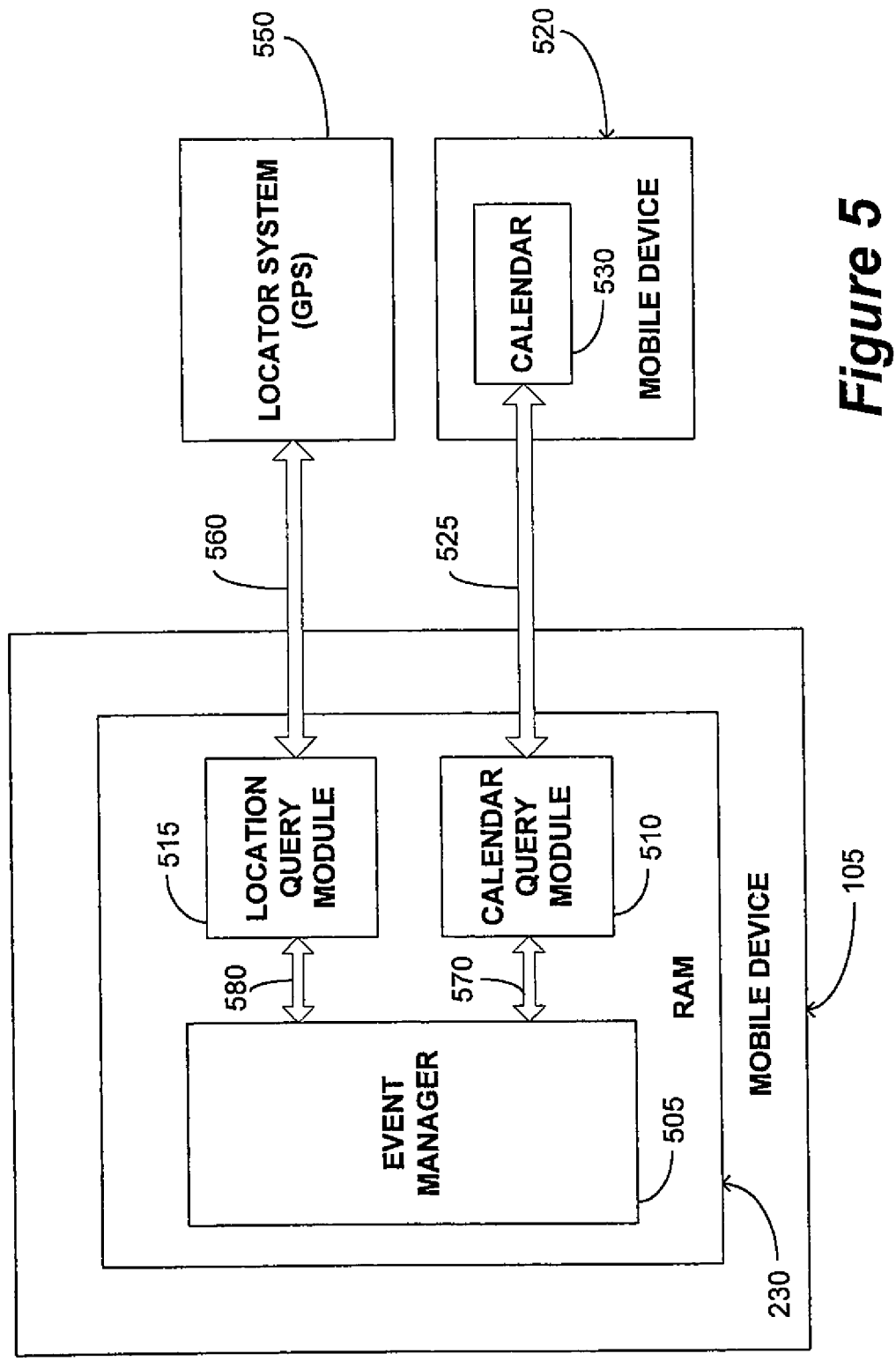
FIG. 5 is a block diagram of an inventive peer-to-peer mobile device event scheduling system.

FIG. 5 depicts mobile device event management system 500 for managing events between mobile device 105 and a second mobile device 520. Mobile device 105 comprises, in addition to the components discussed with respect to FIG. 2, event manager 505, calendar query module 510, and location query module 515, which are preferably implemented in software (i.e., executable in RAM 230) using a suitable API, such as BREW or Java. Calendar query module 510 queries a second mobile device 520 over wireless channel 525 to obtain information stored in its calendar 530. Location query module 515 queries a locator system 550, such as a satellite-based GPS, over wireless channel 560 to obtain the location of second mobile device 520. Modules 510 and 515 communicate with manager 505 via busses 570 and 580.

The peer-to-peer implementation of system 500 depicted in FIG. 5 is effective for managing events, such as schedule creation and synchronization, between two mobile devices 105 and 520. A server could also be added to system 500 to permit shared calendar and event synchronization, update and modification among many users.

Mobile device 520, like mobile device 105, may be any of a wide array of mobile communication products, including cellular telephones, personal digital assistants, portable personal computers with wireless capability, and the like. Likewise, channel 525 may be any of a large number of wireless air interfaces available for establishing a wireless link. For example, channel 525 can be a public or private W-WAN or W-LAN, such as a personal communication service (PCS) network using CDMA, a global system for mobile communication (GSM) network using time division multiple access (TDMA), and/or even a local wireless personal area network (PAN) incorporating Bluetooth™ technology.

Figure 6:
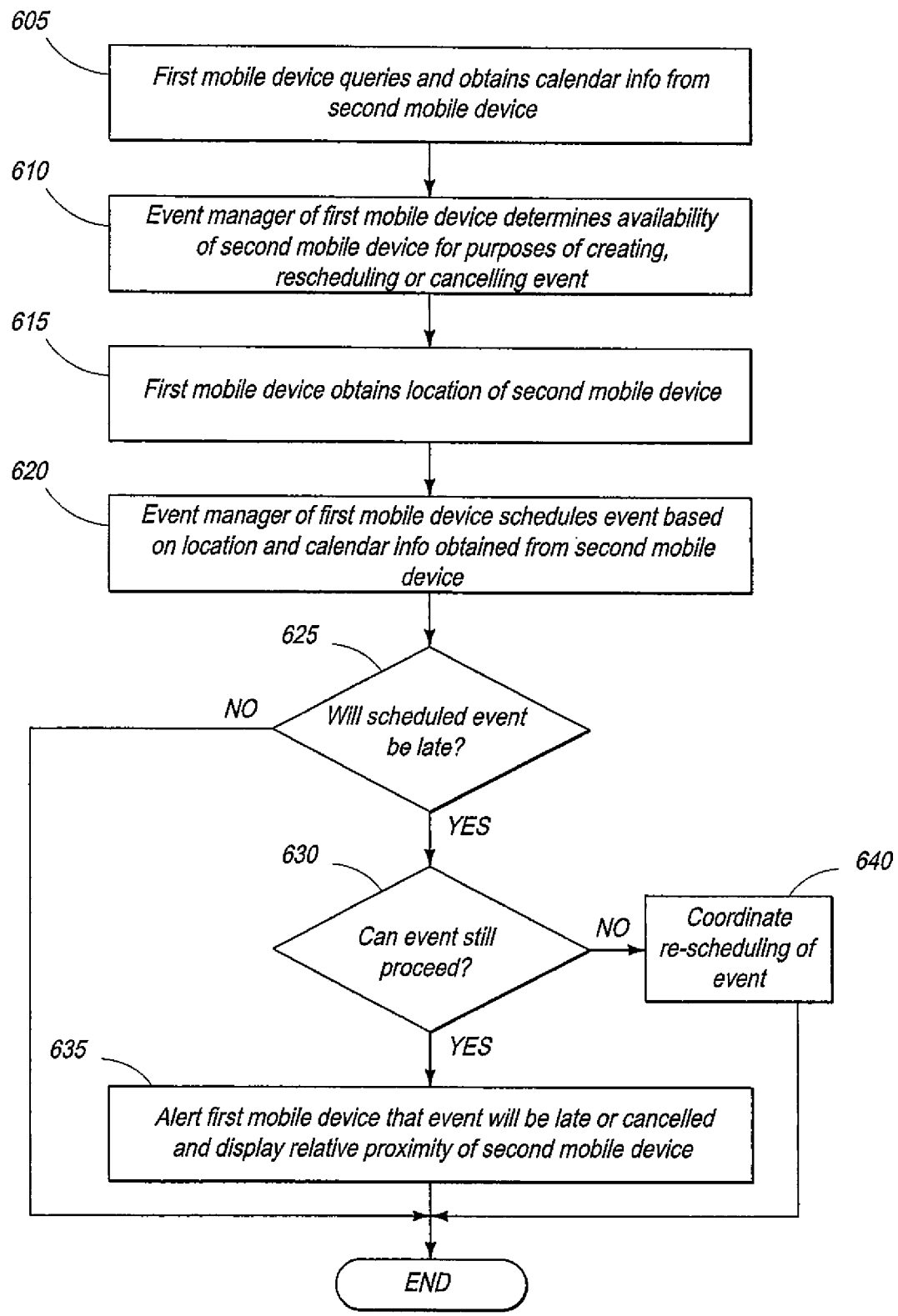
FIG. 6 is a block diagram of an inventive mobile device event scheduling system.

FIG. 6 illustrates a method 600 for mobile device event management. In step 605, a first mobile device, such as device 105 of FIG. 5, queries and obtains calendar information from a second mobile device, such as device 520. The user of device 105, for example, may want to schedule a meeting with the user of device 520. Step 605 can be performed, for example, by calendar query module 510. The calendar information may comprise any of the information typically found in modern calendar applications, such as meeting location, date, and time. From this information, in step 610, the event manager of the first mobile device determines the availability of the second mobile device for purposes of creating, rescheduling, or canceling an event.

In step 615, the first mobile device obtains the location of the second mobile device. Step 615 can be performed, for example, by location query module 515. The location information may be obtained using a global positioning system (GPS) and may take the form of latitude or longitude data. This information is used to determine the relative proximity of the second mobile device to the first mobile device. In step 620, the event manager of the first mobile device schedules an event based on the location and calendar information obtained from the second mobile device.

Event management may include checking the status of and updating an existing event. Method steps 605-620 can be used by a first mobile device, for example, to determine whether the user of a second mobile device will be on time to a scheduled event. By considering the current time, the time that the event is scheduled and the relative proximity of the two devices, it can be determined whether a scheduled event will be late (step 625). If the second user will be late but the event can still proceed (step 630), the user of the first (querying) mobile device may be alerted that the scheduled event is going to be late or cancelled, and the relative proximity of the second mobile device can be displayed (step 635). If the event is going to be missed completely, in step 640, the two mobile devices can coordinate a re-scheduling of the event.

Not all steps of method 600 will are performed in each instance. When a mobile device contacts another mobile device to schedule an event in the distant future, for example, steps 610 and 615 may be omitted since it is only necessary to determine the other device's availability. Its current location is not relevant so far in advance of the event. Likewise, a device may sometimes be interested only in the current location of another device, and not in its calendar information.

Method 600 may also be used to track the location/proximity of another mobile device. This location/proximity information may be displayed in a simple fashion, for example, by analyzing the longitude/latitude information of each party, scaling this information to the device display size, and then displaying relative proximity through the use of spaced dots. More complex displays may be used if device display and capability permits. Location boundaries may be established for a first mobile device, and an alert may be provided to a second mobile device if the first mobile device has left those boundaries. This can be extremely useful for monitoring children and pets, for example.

Figure 7:
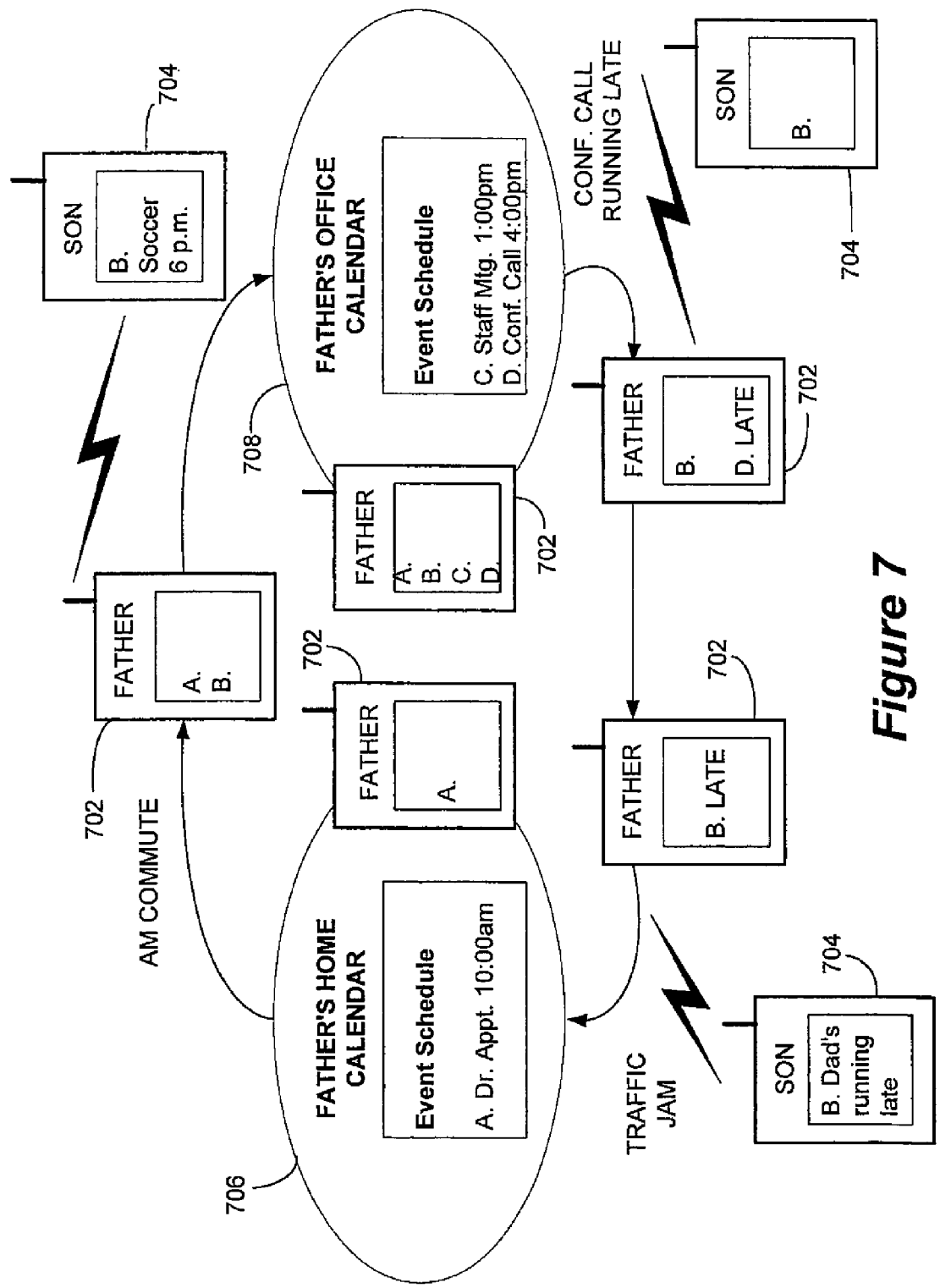
FIG. 7 is a flow diagram of an inventive method for mobile device event scheduling.

FIG. 7 demonstrates an example of method 600 in action. A first mobile device 702 and a second mobile device 704 are configured with event managers, location query modules and calendar query modules as described with reference to mobile device 105. In the example illustrated in FIG. 7, first mobile device 702 belongs to a father and second mobile device 704 belongs to his son. Before his morning commute, father synchronizes the calendar information stored in his mobile device 702 with the information stored in his home calendar 706. Home calendar 706 may be stored in, for example, father's home computer. Synchronization may be performed in a known matter Over a cable or wireless link. In this example, one event is added to the calendar information stored in father's mobile device 702: event A, a doctor's appointment at 10:00 a.m.

On his way to work, father's mobile device 702 is queried by son's mobile device 704 for his availability to attend son's soccer game that night at 6 p.m. (i.e., step 605 in FIG. 6). From father's calendar information, son's mobile device determines that father is available (step 610) and the event ("B") is scheduled on father's mobile device (step 620).

When father arrives at his office, father again synchronizes the calendar information stored in his mobile device 702, this time with the information stored in his office calendar 708. Office calendar 708 may be stored in, for example, father's office computer. Synchronization may be performed in a known matter over a cable or wireless link. Two more events are added to the calendar information stored in father's mobile device 702: event C: a staff meeting at 1:00 p.m.; and event D, a conference call at 4:00 p.m.

As the day progresses and son's soccer game draws near, son's mobile device 604 automatically queries and obtains the location of father's mobile device 602 to determine whether father will be on time for son's soccer game. If, for example, father's 4:00 p.m. conference call runs late, the location query module of son's mobile device 604 will note that father's mobile device 602 is still located at father's office, and can provide an alert on son's mobile device display that father will likely be late. Son's mobile device 604 may also modify its stored calendar information to reflect the fact that father will be late.

When father leaves his conference call, he becomes delayed in a traffic jam. The location query module of son's mobile device notes the location of father's mobile device and alerts son's mobile device that father is running even later or perhaps will miss the game entirely. Father's mobile device 602, conversely, can help father make the game by providing a suggestion for a less congested alternate route with real time directions and a visual map of the alternate route. Such information may be obtained from the Internet, for example. Son's mobile device 604 may display the relative proximity of father's mobile device 602 and, when son's location query module confirms that father's mobile device 602 is within a defined proximity (i.e., within five miles of the soccer field), it may cause son's mobile device to issue an appropriate alert (i.e., beeping, flashing, vibrating, etc.).

Father's mobile device event scheduler may also be configured to issue alerts to the mobile devices of all users with whom he is scheduled to meet in the event that father's schedule unexpectedly changes. If father is called away on an emergency business trip, for example, father's mobile device 602 may automatically alert son's mobile device 604 that father will miss son's soccer game entirely.

Real time location information is typically gathered using a locator network of fixed location devices, such as cellular base stations. In rural or obstructed urban areas, however, there may be no base station coverage. While a GPS reading may be possible in these areas, some locations are impenetrable even to a satellite, such as in the basement of a highrise building. Thus, the present invention contemplates extending the physical reach of real time event scheduling through the use of strategically placed locator networks.

Figure 8:
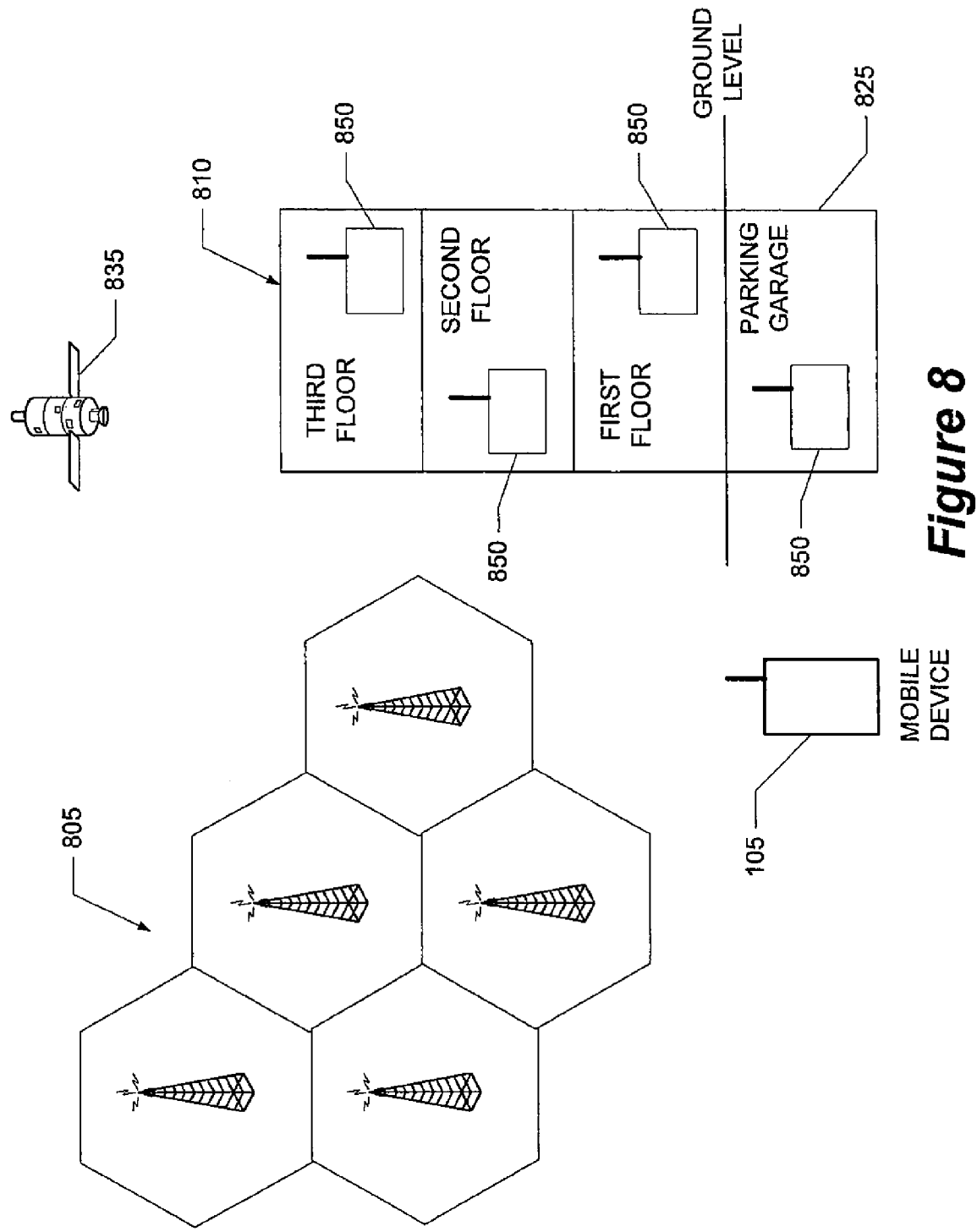
FIG. 8 is a diagram of an inventive network of fixed location devices for assisting in mobile device event scheduling and location.

FIG. 8 shows a mobile device 105 passing through a series of overlapping wireless coverage areas, including cell network 805 and coverage provided by satellite 835. When mobile device 105 enters the underground parking garage 825 of office building 810, however, it will likely lose the coverage previously provided by cell network 805. Neither cell nor satellite coverage may be available within the entire interior of building 810 Typically, neither coverage by cell network 805, nor satellite system coverage from satellite 835 will extend to the interior of building 810.

A network of fixed location devices 850 is provided throughout building 810 to extend the range of wireless coverage so that the systems and methods for wireless device event scheduling can be effectively deployed in a locale. In FIG. 8, each floor as well as the parking garage is shown as having a fixed location device 805. Fixed location devices 850 may be any intelligent device that can be networked together to enable end-to-end wireless communication with another device. They will typically employ a short range wireless technology such as wireless LAN, Bluetooth or the like. Fixed location devices 850 may be implemented in, for example, a vending machine network, interconnected to feed location information on mobile device 105 back through the cellular network via a direct connection to the cell core or via a fixed location that is within the coverage area of network 805. As mobile device 105 transits building 810, its location is tracked by the fixed location devices and ultimately relayed back to cellular network, enabling real time event scheduling and updating to continue even while device 105 is outside the coverage area of a traditional wireless network.

The use of fixed location devices in the context of an office building is just one example of the range extending aspects of the present invention. In rural areas without cellular coverage, location and other information from one mobile device could be passed from car to car via fixed location equipment contained in the cars (via a wireless LAN module, Bluetooth or other short range technology) until one car carrying the information enters the range of a cellular network and the information is able to hop on to the network. VoIP could possibly be used to transmit voice signals in such situations as well.

Combining these two examples, a backpacker's mobile device might attempt to send location or calendar information in a rural area with no coverage and little auto traffic. The rural area might have, however, a vending machine equipped with a fixed location short range wireless device. The vending machine stores the backpackers information until a passing car, also equipped with a fixed location device, receives the backpacker's data from the vending machine and then passes it to other cars, one eventually entering the coverage area of a cellular network.

Other types of valuable information might also be conveyed in this manner. In the event of an auto accident, for instance, emergency signals might be sent from car to car (via wireless LAN modules or the like) from the point of the accident to warn approaching cars of the accident ahead and to alert police and emergency personnel. Automobiles might also be equipped with a camera and appropriate computer hardware, including a video encoder as previously described. In the event of a car theft, live images of the thief as well as location information could be conveyed to law enforcement authorities in the manner described to help to quickly thwart the crime. Cameras may be configured to take photographs both inside and outside the automobile to assist in identification and location determination. Combined with the examples described above, a thief could not escape the law even by driving into a parking garage (assuming it is equipped with fixed location devices). In the example of an automobile, it should be noted that locator devices such as OnStar from OnStar Corp. could alternately be used to provide the location information.

The information gathered using the mobile device event scheduling and location determination techniques of this invention may be used in additional advantageous ways. A mobile device may be provided with appropriate software to track and store this calendar and location information, and to thereby gradually learn the habits, likes and dislikes of the device user. The device may learn, for example, when its user leaves for work, how the user drives to work and when and how it returns home. The device may learn where and at what time the user likes to each lunch. Eventually, the mobile device can develop a knowledge-based "personality" that reflects the user's personality, and might even make suggestions to the user. If the user is in an unfamiliar city, for example, the device may know that the user likes Chinese food (from his many scheduled lunches at Chinese restaurants, for example), and may obtain information from the Internet about nearby Chinese restaurants and their locations. Based on this information, the device can suggest and schedule a lunch at a nearby Chinese restaurant.

This knowledge-based application of the present invention can be extended to applications other than conventional mobile communication devices. One's dog could be equipped with a wireless collar, for example, that tracks the dog's location as well as gathers data indicative of the dogs health. Where warranted, the collar could automatically generate a recommendation that a vet appointment be scheduled, and query the owner's mobile device (as described) to recommend an appointment time. Similarly, an Alzheimer's patient could be tracked using a wirelessly equipped wristband to feed location information back to a caregiver's event scheduler, perhaps to know when a medication dose is next needed.

Numerous embodiments of the present invention have been shown and described herein. It should be understood, however, that these have been presented by way of example only, and not as limitations. The breadth and scope of the present invention is defined by the following claims and their equivalents, and is not limited by the particular embodiments described herein.

The invention claimed is:

1. A wireless video monitoring system comprising:
    a camera for capturing a live video image;
    a computer coupled to the camera and comprising a software-based video encoder for encoding and streaming the video image and a software-based video decoder for decoding camera control information encoded in a video compression protocol; and
    a mobile device comprising another software-based video decoder for receiving, decoding and displaying the video image and another software-based video encoder for encoding the camera control information in the video-compression protocol, the mobile device transmitting the video compressed encoded camera control information to the computer for full duplex video operation, and the mobile device not having a dedicated hardware-based video decoder, wherein
    the video images are encoded by the computer as multi-packet MPEG frames and are streamed sequentially to the mobile device,
    the mobile device decodes and completes assembly of each received complete multi-packet frame before signaling the computer with a one byte header to send the next multi-packet frame, and
    the software-based video decoder for decoding camera control information encoded in a video compression protocol is based on software different from the software on which the another software-based video encoder for encoding the camera control information in the video-compression protocol is based.

2. A system as claimed in claim 1, wherein the control information controls basic camera functions.

3. A system as claimed in claim 1, wherein the mobile device comprises a display configured to best take advantage of the available storage capacity of the mobile device.

4. A system as claimed in claim 1, and further comprising a network of fixed location, short-range wireless devices for storing and tracking the location of a second mobile device when the second mobile device is not within the range of a conventional cellular or satellite communications network.

5. A system as claimed in claim 1, wherein the mobile device further comprises a location query module to obtain a location of the camera in conjunction with the streaming video image.

6. A system as claimed in claim 5, wherein the location of the camera is obtained by a global positioning system.

7. A system as claimed in claim 5, wherein the location query module obtains the location of the camera in response to a predetermined event.

8. A method for wireless monitoring on a mobile device comprising:
    receiving an encoded video stream from a remote camera;
    transmitting video-compression protocol encoded camera control information to the remote camera based on a software-based video encoder;
    decoding and displaying the video stream on the mobile device based on a software-based video decoder for full duplex video operation, the mobile device not having a dedicated hardware-based video decoder, wherein the video stream is encoded as multi-packet MPEG frames and are streamed sequentially to the mobile device;

completing assembly of each received complete multi-packet frame; and signaling a computer with a one byte header to send the next multi-packet frame after decoding and completing assembly of the each received complete multi-packet frame, wherein the software-based video encoder is based on software different from the software on which the software-based video decoder for full duplex video operation is based.

9. A method as claimed in claim 8, wherein the encoded video stream comprises a real-time video feed.

10. A method as claimed in claim 8, wherein the encoded video stream comprises a summary file of images containing significant activity.

11. A method as claimed in claim 10, wherein the summary file contains images in which motion was detected.

12. A method as claimed in claim 8, wherein the encoded video stream is received only when significant activity occurs and is accompanied by an alert to the user of the mobile device.

13. A method as claimed in claim 8, and further comprising:

obtaining a location of the camera in conjunction with the received encoded video stream.

14. A method as claimed in claim 13, wherein the location of the camera is obtained by a global positioning system.

15. A method as claimed in claim 13, wherein the location of the camera is obtained in response to a predetermined event.

* * * * *